US011689818B2

(12) United States Patent
Berry et al.

(10) Patent No.: US 11,689,818 B2
(45) Date of Patent: Jun. 27, 2023

(54) SYSTEM AND METHOD FOR EVALUATING THE INTERNAL STATE OF A MEDIA LIBRARY

(71) Applicant: QUANTUM CORPORATION, San Jose, CA (US)

(72) Inventors: David Berry, Colorado Springs, CO (US); Carl Germany, Colorado Springs, CO (US)

(73) Assignee: QUANTUM CORPORATION, San Jose, CA (US)

( * ) Notice: Subject to any disclaimer, the term of this patent is extended or adjusted under 35 U.S.C. 154(b) by 129 days.

(21) Appl. No.: 16/745,188

(22) Filed: Jan. 16, 2020

(65) Prior Publication Data

US 2021/0227149 A1 Jul. 22, 2021

(51) Int. Cl.
*H04N 23/90* (2023.01)
*G11B 33/06* (2006.01)
*H04N 23/51* (2023.01)
*H04N 23/54* (2023.01)
*H04N 23/74* (2023.01)

(52) U.S. Cl.
CPC ............ *H04N 23/90* (2023.01); *G11B 33/06* (2013.01); *H04N 23/51* (2023.01); *H04N 23/54* (2023.01); *H04N 23/74* (2023.01)

(58) Field of Classification Search
CPC .... H04N 5/247; H04N 5/2252; H04N 5/2253; H04N 5/2354; H04N 5/2256; H04N 5/2257; H04N 5/2258; H04N 5/23241; G11B 33/06; G11B 15/6835; G11B 17/225; G11B 15/6895; B25J 9/1692; G05B 2219/39024
See application file for complete search history.

(56) References Cited

U.S. PATENT DOCUMENTS

| | | | | |
|---|---|---|---|---|
| 5,814,171 | A * | 9/1998 | Manes | G11B 15/6825 |
| 6,473,371 | B1 * | 10/2002 | White | G11B 17/225 |
| 2005/0080512 | A1 * | 4/2005 | Critchlow | B25J 9/1692 |
| 2006/0262447 | A1 * | 11/2006 | Hoshino | G11B 15/6835 |
| 2007/0268791 | A1 * | 11/2007 | Grow | G11B 33/14 |
| | | | | 369/30.64 |
| 2018/0330489 | A1 * | 11/2018 | Kido | G06T 7/0004 |
| 2021/0207957 | A1 * | 7/2021 | Haeusler | G06T 7/73 |

FOREIGN PATENT DOCUMENTS

JP H10162461 A * 2/2003

* cited by examiner

*Primary Examiner* — Maria E Vazquez Colon
(74) *Attorney, Agent, or Firm* — Roeder & Broder LLP; James P. Broder

(57) ABSTRACT

A state evaluator for use in a media library includes a housing and a first camera that is coupled to the housing. In some embodiments, the state evaluator can also include one or more of a light assembly, an indicator assembly to indicate different conditions associated with the state evaluator, an input assembly, an internal power source, and a power module. The power source can be rechargeable and/or removable. The first camera can capture visible light, infrared light, and/or ultraviolet light images. The light assembly can emit visible light, infrared light, and/or ultraviolet light. The state evaluator can have a high intensity light source and can communicate with a host system. The state evaluator can also include a second camera that can be coupled to the housing.

20 Claims, 5 Drawing Sheets

SYSTEM AND METHOD FOR EVALUATING THE INTERNAL STATE OF A MEDIA LIBRARY

BACKGROUND

Automated media libraries (sometimes referred to herein as "media library" or "media libraries") are commonly utilized for purposes of writing data to and reading data from media cartridges. In particular, the media libraries typically include a media storage retrieval assembly (sometimes referred to herein as a "media retriever") that selectively retrieves and moves media cartridges as desired between storage locations and media drives within the media library. Most media libraries are enclosed, making it difficult to determine the physical state of the mechanics and other structures inside the media library. Usually, media cartridges, such as tape cartridges, are loaded to and/or unloaded from each storage location in the media library by calibrating the mechanics in an external fixture to predict calibration offsets in the media library. Unfortunately, this type of measurement can lead to unknown offsets that can affect the reliability of moving the media cartridge inside the media library. Accordingly, it is desired to develop a system and method for effectively determining the internal state of an automation device, such as a media library, so that any offsets can be measured in a more reliable manner.

SUMMARY

The present invention is directed toward a device for monitoring the interior of a larger unit. More specifically, the present invention is directed toward a state evaluator for use in a media library. In various embodiments, the state evaluator can include a housing in the form of a media cartridge, such as an LTO media cartridge, and a camera disposed on the housing. The camera can be configured with a field of view external to the housing and to generate data representative of the field of view.

Additionally, or in the alternative, in various embodiments, the camera can be configured to generate data representing at least one of infrared wavelengths and ultraviolet wavelengths in the field of view.

In certain embodiments, the state evaluator further includes a power source disposed inside the housing, where the power source is configured to provide power to at least the camera.

Additionally, or in the alternative, in some embodiments, the state evaluator can further include a controller disposed inside the housing. The controller can be configured to control at least the operation of the camera and the exchange of data between the state evaluator and an external device, such as for example, the media library's control system or a host system separate from the media library.

In various embodiments, the data can represent an internal state of the media library. In some embodiments, the internal state of the media library can be based in part on the current state of one of a media drive system, a media retriever, and a storage location.

Further, in some embodiments, the housing includes a recess disposed on at least one of a side, a top, and a bottom of the housing. The camera can be positioned at least partially within the recess.

In various embodiments, the state evaluator can also include a light assembly. The light assembly can be configured to illuminate the field of view of a camera.

Additionally, or in the alternative, in various embodiments, the light assembly can be configured to vary the wavelength of light emitted by the light assembly.

In some embodiments, the light assembly includes at least one light emitting diode ("LED").

In various embodiments, the light assembly can be configured to simultaneously emit at least two different wavelengths of light. The wavelengths of light include visible, infrared, and ultraviolet.

Additionally, or in the alternative, in various embodiments, the state evaluator can also include a second camera disposed in a recess on the housing. The second camera can be configured with a second field of view. The second field of view may be different from the first field of view.

In various embodiments, the state evaluator can be configured to communicate with an external device, such as a control system or a host system.

In some embodiments, the state evaluator can communicate wirelessly with an external device.

In certain embodiments, the state evaluator can also include at least one indicator disposed on the housing. The indicator can be configured to indicate an internal condition of the state evaluator.

In various embodiments, the present invention is also further directed toward a state evaluator comprising a housing, a first camera, and a second camera. The housing may be in the form of a media library cartridge. The first camera can be disposed in a first recess in or on the housing. The second camera can be disposed in a second recess in or on the housing.

In some embodiments, the first camera can have a first field of view. The second camera can have a second field of view that is different from the first field of view.

In various embodiments, the state evaluator can be configured to communicate with an external device.

The present invention can be further directed toward a method of using a state evaluator for evaluating an internal state of a media library, comprising the steps of coupling a camera to a housing having a form factor of a media cartridge, the camera having a field of view external to the housing, then generating data with the camera that is representative of the field of view.

In some embodiments, the method of using a state evaluator for evaluating the internal state of a media library further comprises the step of communicating the data to an external device. The external device may be a control system or a host system. The communication may be effectively real time or time delayed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a system and method for determining the internal state of an automated device, such as an automated media library. In various embodiments, the system and method is usable in automation devices such as an automated media library.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
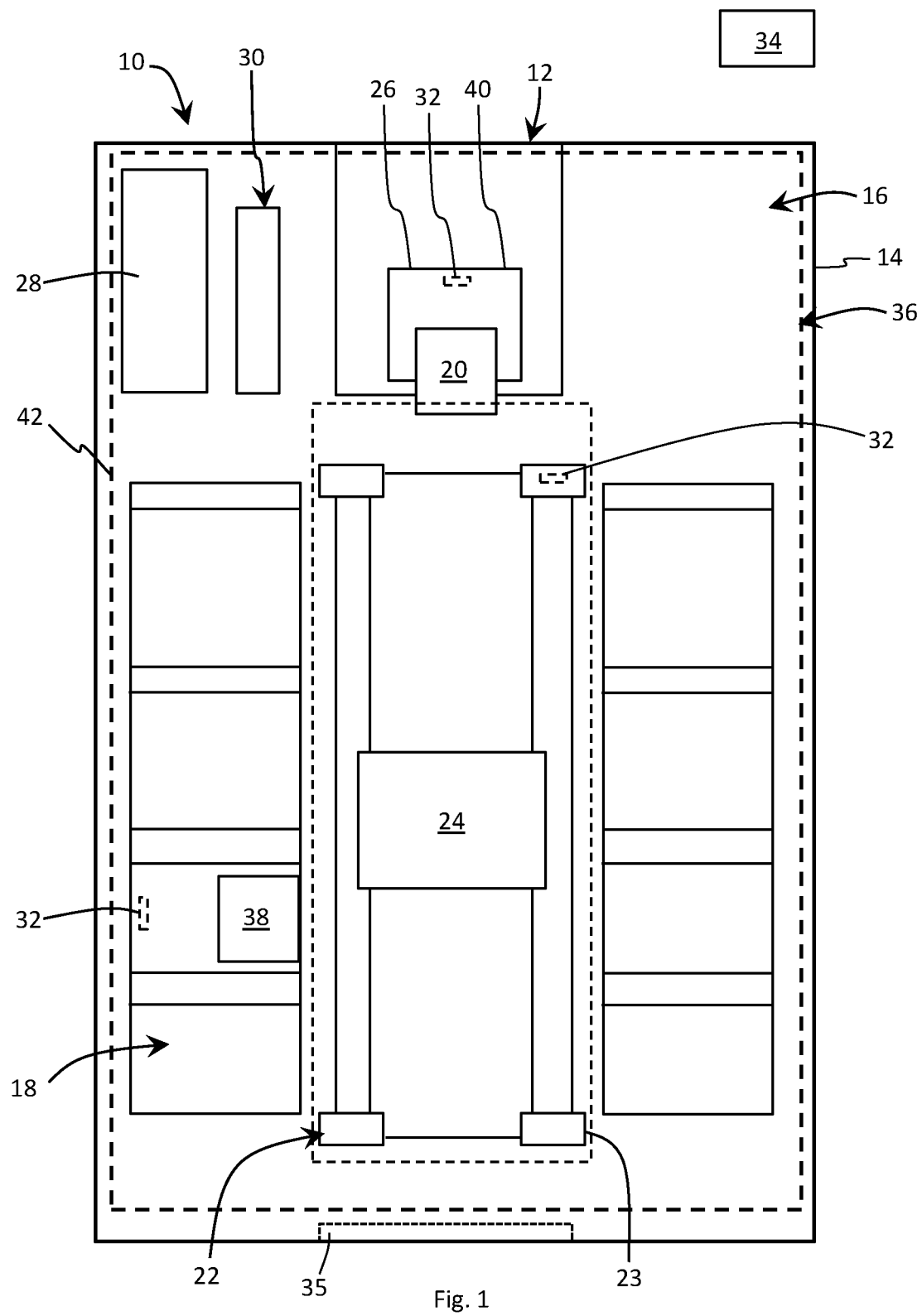
FIG. 1 is a simplified schematic top view illustration of an embodiment of an automated media library having features of the present invention, including a state evaluator.

FIG. 1 is a simplified schematic top view illustration of a media library 10, e.g., a tape library in certain embodiments, including a media drive system 12, e.g., a tape drive system in certain embodiments, having features of the present invention. In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges 20. More specifically, it is noted that the media library 10 illustrated in FIG. 1 is just one non-exclusive example of a media library 10 usable with the present invention, and no limitations are intended based on the specific type and/or size of the media library 10 shown in FIG. 1. Additionally, although the media library 10 shown and described relative to FIG. 1 is specifically shown and/or described at times as a tape cartridge library or tape library, it is understood that the present invention is equally applicable for use with any other suitable types of libraries using other types of media cartridges, such as optical disks, magnetic disk drives, emulated or virtual media drives, etc., as non-exclusive examples. However, for ease of discussion, FIG. 1 and certain other Figures herein are sometimes described using tape cartridges as the applicable media cartridges 20, although this is not intended to restrict or limit the present invention in this manner.

In various embodiments, as illustrated in FIG. 1, the media library 10 can include one or more of: (i) a library housing 14 that defines a library interior 16, (ii) a plurality of storage locations 18 that are each configured to receive and selectively retain (and store) a media cartridge 20, e.g., a tape cartridge in certain embodiments, (iii) a rack assembly 22 including one or more racks 23, (iv) a media cartridge retrieval assembly 24 (also sometimes referred to herein as a "media retriever"), (v) the media drive system 12 including one or more media drives 26, e.g., tape drives in certain embodiments, (vi) a power supply 28, (vii) a control system 30, (viii) a graphical user interface 35 (illustrated in phantom, and also sometimes referred to herein as a "GUI"), (ix) a retriever replacement system 36 (illustrated in phantom), (x) a state evaluator 38 positioned in a storage location 18, and (xi) position markers 32 located at various positions in the media library's 10 interior. It is appreciated that in different embodiments, the media library 10 can include more components or fewer components than what is illustrated and described in relation to FIG. 1. For example, as provided herein, in certain embodiments, the media library 10 can further include a service module (not shown) into which the retriever replacement system 36 can be integrated.

The library housing 14 is configured to retain various components of the media library 10. For example, as shown in FIG. 1, the plurality of storage locations 18, the rack(s) 23 of the rack assembly 22, the media retriever 24, the one or more media drives 26 of the media drive system 12, the power supply 28, the control system 30, the retriever replacement system 36, and the state evaluator 38 can all be received and retained at least substantially, if not entirely, within the library interior 16 that is defined by the library housing 14. Additionally, as illustrated in FIG. 1, the library housing 14 can be rigid and have a substantially rectangular-shaped cross-section. Alternatively, the library housing 14 can have another suitable shape or configuration. For example, the library housing 14 can have a substantially square-shaped or any other suitable shaped cross-section. Further, the library housing 14 may be constructed of any number of conventional materials such as, for example, those utilized in industry standard rack mount cabinets.

In the embodiment shown in FIG. 1, the plurality of storage locations 18 can be positioned within the library housing 14, with the storage locations 18 being configured to receive and retain (and store) the media cartridge(s) 20 or the state evaluator 38. More particularly, in various embodiments, each of the storage locations 18 is configured to receive and retain a single media cartridge 20 or state evaluator 38. It is noted that only a state evaluator 38 is shown as being retained within the storage locations 18 in FIG. 1 for clarity. In various embodiments, the media library 10 can include any suitable number of storage locations 18, and/or the media library 10 can be designed to retain any suitable number of media cartridges 20 or state evaluators 38. Alternatively, the storage locations 18 can be arranged in a different manner than is illustrated and described relative to FIG. 1.

The rack assembly 22 and/or the one or more racks 23 are configured to support the media retriever 24 during use of the media retriever 24 within the media library 10. The design and configuration of the rack assembly 22 can be varied to suit the specific requirements of the media library 10. For example, in one non-exclusive embodiment, the rack assembly 22 can include four individual racks 23 that are spaced apart from one another. Additionally, in some embodiments, each rack 23 can be oriented in a generally vertical direction and can extend a height that is sufficient to enable the media retriever 24 to effectively retrieve a media cartridge 20 or state evaluator 38 from any of the plurality of storage locations 18. Alternatively, the rack assembly 22 can include a different number of racks 23. For example, in some non-exclusive alternative embodiments, the rack assembly 22 can include two racks 23, three racks 23 or more than four racks 23 that can be spaced apart from one another.

The media storage retrieval assembly 24 selectively, e.g., upon request of a user, retrieves and moves the media cartridge 20 or state evaluator 38 as desired between the storage locations 18 and the media drives 26. In particular, during use, upon receiving a signal from the control system 30 to access a certain media cartridge 20 or state evaluator 38, the media retriever 24 can be manipulated to physically retrieve the requested media cartridge 20 or state evaluator 38 from its associated storage location 18 in the media library 10. Subsequently, the media retriever 24 moves the media cartridge 20 or state evaluator 38 to an appropriate media drive 26, and inserts the media cartridge 20 or state evaluator 38 into a drive housing 40 of the media drive 26 so that the requested read/write or monitoring operations can be performed. Upon completion of the requested read/write or monitoring operations, the media retriever 24 can then return the media cartridge 20 or state evaluator 38 to an appropriate storage location 18 or other suitable location.

Additionally, it is appreciated that although a single media retriever 24 is illustrated in FIG. 1, the media library 10 can be designed to include more than one media retriever 24. For example, in one non-exclusive alternative embodiment, the media library 10 can include two media retrievers 24 to function in different portions of the media library 10 and/or to provide redundancy in the event that one of the media retrievers 24 fails.

The one or more media drives 26 are configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing there between). Alternatively, the media library 10 can include greater than three or fewer than three media drives 26 and/or the media drives 26 can be positioned in a different manner relative to one another. Further, depending on the specific design of the media library 10, the media drives 26 can be adapted for use with different types of media, such as tape cartridges, optical drives, hard disk drives, etc.

Further, in certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one such embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the media retriever 24, the control system 30, the retriever replacement system 36, and/or additional media libraries 10. The power supply 28 can be interfaced with these components as well as with an external power source in a well-known manner using industry standard cabling and connections. Alternatively, the power supply 28 can be interfaced with these components in another manner.

The control system 30 provides the desired and necessary control for general functionality of the media library 10. The control system 30 can have any suitable design, many of which are well-known in the industry. For example, in one embodiment, the control system 30 can include a standard driver interface unit for receiving digital commands and translating the commands into driving currents, such as step pulses for controlling stepper motors, and/or for controlling the retriever replacement system 36. Further, the control system 30 can include a standard programmable general purpose controller formed on a single plug-in card unit and can include a programmed microprocessor or microcontroller, memory, communication interface, control interface, connectors, etc. Alternatively, the control system 30 can have a different design and/or the control system 30 can be positioned within the media library 10 in a different position or manner than that illustrated in FIG. 1. In certain embodiments, the control system 30 is configured to communicate with the state evaluator 38. The communication may be wireless such as WiFi, Bluetooth, and NFC or through a wired connection. In other embodiments, the state evaluator 38 communicates only with a host system 34 (illustrated as a box).

Further, as shown, the media library 10 can also include the GUI 35, e.g., an interactive touchscreen display or another suitable graphical user interface, which allows the user to interact with and/or transmit requests or commands to the media library 10. For example, the GUI 35 can allow the user to transmit requests for moving certain media cartridges 20 or state evaluator 38, i.e. with the media retriever 24, between the storage locations 18 and the media drives 26 or between storage locations 18. Additionally, the GUI 35 can further allow the user to transmit requests for removing and/or replacing the media retriever 24, i.e. through operation of the retriever replacement system 36. Further, the GUI 35 can also allow the user to transmit requests for evaluating the state of one or more of the components within the library interior 16, i.e. through operation of the state evaluator 38.

The retriever replacement system 36 is configured to enable the user to quickly and easily remove and replace the media retriever 24 from within the library interior 16 of the library housing 14, as desired. More specifically, in certain embodiments, the retriever replacement system 36 includes a service tray 42 (illustrated in phantom), which is configured to selectively receive and retain the media retriever 24 when it is desired to move the media retriever 24 out of or back into the library interior 16. With such design, the service tray 42, with the media retriever 24 effectively retained thereon and/or secured thereto, can be quickly and easily removed from the library interior 16, and/or inserted back into the library interior 16.

The state evaluator 38 is configured to evaluate and/or monitor the internal state, or status, of various components inside an automation device, such as the media library 10. As used herein, the state or status of the various components being evaluated or monitored by the state evaluator 38 can include the actual or relative positioning of such components, the functioning of such components, the temperature of such components, and/or any other important or useful information or data required by the media library 10 or host system 34. As described in detail herein, the structure, specific components and/or features, size and/or positioning of the state evaluator 38 can vary to suit the design requirements of the media library 10. The state evaluator 38 can be positioned in any suitable manner within and/or can be incorporated into any suitable component of the media library 10. For example, in some embodiments, as shown in FIG. 1, the state evaluator 38 can be incorporated into a form factor substantially similar to the media cartridge 20. In various embodiments, the media cartridge 20 or state evaluator 38 can be movable, i.e. with the media retriever 24, between one of the storage locations 18 and one of the media drives 26, between two of the media drives 26 between two of the storage locations 18, and/or between any two suitable structures within the media library 10. Additionally, or in the alternative, the state evaluator 38 can be moved in a different manner within the media library 10. Still alternatively, the state evaluator 38 can be incorporated into another component of the media library 10. For example, in certain non-exclusive alternative embodiments, the media library 10 can include one or more cameras that are incorporated into the library housing 14, the storage locations 18, the rack assembly 22 (e.g., one of the racks 23), the media retriever 24, the media drive system 12 (e.g., one of the media drives 26), and/or the retriever replacement system 36. In certain embodiments, one or more cameras can be installed inside a state evaluator 38. The state evaluator 38 may be configured to measure mechanical offsets used to calibrate the position of an internal component of the media library, such as the media retriever 24, thereby determining a more precise location and/or condition of the internal components in the medial library 10. In other embodiments, the state evaluator 38 may have additional functions such as, for example, vibration detectors, orientation detectors, and temperature sensors that include laser based temperature-sensing devices. A laser based temperature-sensing device may be used to determine the temperature of the various components and sub-systems in the library interior 16.

Figure 2A:
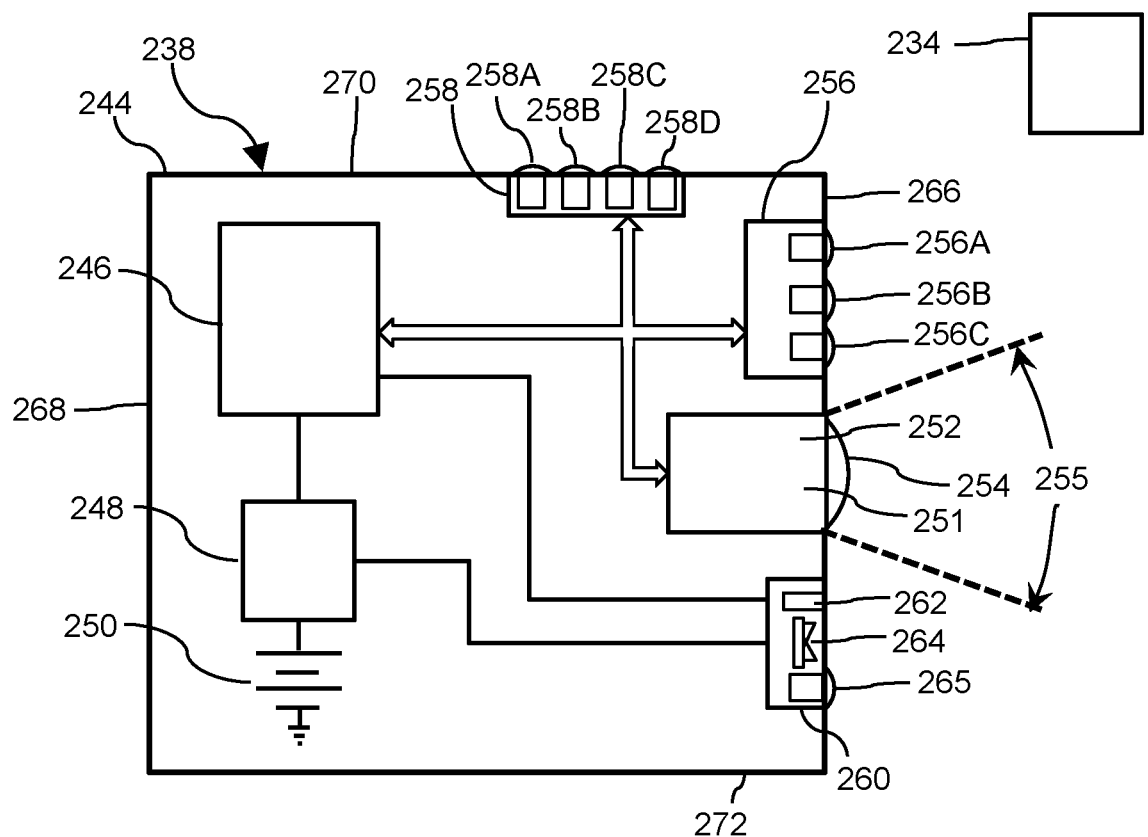
FIG. 2A is a simplified schematic top view of an embodiment of the state evaluator.

FIG. 2A is a simplified schematic top view illustration of one embodiment of the state evaluator 238. The design of the state evaluator 238 can be varied as desired or required by the design requirements of the media library 10 (illustrated in FIG. 1). In particular, the state evaluator 238 can have any suitable design that is capable of capturing image data including visible, infrared, and ultraviolet data. More specifically, it is noted that the state evaluator 238 illustrated in FIG. 2A is just one non-exclusive example of a state evaluator 238 usable with the media library 10, and no limitations are intended based on specific type and/or size of the state evaluator 238 as shown in FIG. 2A. Additionally, although the state evaluator 238 shown and described in FIG. 2A is specifically shown and or described at times as a state evaluator in the form of a media cartridge 20, it is understood that the present invention is equally applicable for use with any other suitable type of media cartridges such as T10000 as a non-exclusive example. Further, the state evaluator 38 can be integrated into other portions of the media library 10. However, for ease of discussion, FIG. 2A and certain other figures herein are sometimes described using media cartridges 20 in the LTO form factor as the applicable media cartridges, although this is not intended to restrict or limit the state evaluator 38 in this manner. In fact, this invention may be used in any form or style housing, including forms or styles that are not in the form or style of a media cartridge 20.

In the embodiment illustrated in FIG. 2A, the state evaluator 238 can include one or more of: an evaluator housing 244 (also sometimes referred to herein simply as a "housing"), a controller 246; a power module 248; a power source 250; a camera assembly 251, a light assembly 256, an indicator assembly 258, and/or an input assembly 260. It is to be appreciated that in various embodiments, the state evaluator 238 can include more or fewer components that what is illustrated and described in relation to FIG. 2A. For example, as provided herein, in certain embodiments, the state evaluator 238 may include a CM reader, wireless charging and communication, and/or a docking header for interfacing with the internal components of the state evaluator 38.

In certain embodiments, the evaluator housing 244 is configured to retain various components of the state evaluator 238. For example, as illustrated in FIG. 2A, the controller 246, the power module 248, the power source 250, the camera assembly 251, the light assembly 256, the indicator assembly 258, and the input assembly 260 can all be received and retained at least substantially, if not entirely, within the evaluator housing 244. Alternatively, the evaluator housing 244 can have a shape and cross-section that closely resembles, if not exactly match, other styles of media cartridges known in the industry. Further, the evaluator housing 244 may be constructed of any materials known in the industry such as, for example, metal, various plastic materials, and/or composite materials.

In certain embodiments, the controller 246 is a low power controller capable of operating many, if not all, of the internal components and communications substantially simultaneously. The controller 246 may be a standard programmable general-purpose computer formed as a single unit and can include a programmed microprocessor or microcontroller, memory, communication interface(s), control interface(s), connectors, etc. The controller 246 may be reprogrammable. Alternatively, certain other embodiments may have additional sub-controllers to operate certain portions of the state evaluator 238. Any additional sub-controller may operate independently from the controller 246 or in conjunction with the controller 246. In some embodiments, the controller 246 is configured to control and receive data from the camera assembly 251 and/or the power module 248 while also controlling the light assembly 256 and the indicator assembly 258. The controller 246 may also be configured to communicate with an external device, such as the media library's 10 control system 30 and/or the host system 234 external to the media library 10.

The controller 246 may be configured to process data from, although not necessarily exclusively, the camera assembly 251 to determine an outcome where, in some embodiments, the outcome affects the operation of the media library 10. In other embodiments, the controller 246 collects and holds data for communication to the control system 30 or the host system 234. In still other embodiments, the controller 246 may have wireless communication capability where the controller 246 can communicate essentially real-time with the control system 30 or the host system 234 or can communicate earlier captured data. The word "essentially" as used with the controller 246 takes into consideration any effects on the flow of data due to disturbances in the communication medium. For example, when the controller 246 communicates wirelessly, interference caused by other portions of the state evaluator 238, other portions of the media library 10, or external sources of interference may cause slowdown in the data flow resulting in data not being presented instantaneously but still effectively delivers data to the control system 30 or the host system 234 on a usable time basis.

The host system 234 may be a computer or other processor-based system external to the media library 10. The host system 234 may utilize software configured to process the data received from the state evaluator 238 to determine precise position and orientation data associated with the internal state of the media library. In some embodiments, the state evaluator 238 may process some of the data and an external device, such as the control system 30 or the host system 234, processes the remainder of the data. In other embodiments, the external device processes all of the data and returns the result of the process to the media library 10 to enhance precision and control of the internal components of the media library 10.

In certain embodiments, the controller 246 can communicate some data real-time then communicate captured data at a later time. For example, the state evaluator 238 can communicate real-time motion video while storing periodic still images. The still images can be of a higher or a lower resolution than the motion video resolution.

The controller 246 may communicate with the control system 30 or the host system 234. The communications may program or reprogram, either partially or entirely, the controller 246. The communications process may also extract stored data from the controller 246 or any other device or sub-system internal to the state evaluator 238, such as local storage. Some embodiments allow the media library 10 or the external device to communicate with the controller 246 through input connector 262. Other embodiments allow the media library 10 or the external device to communicate with the controller 246 using wireless technology. Such wireless technologies may include, but is not limited to, Bluetooth™, NFC™, Wi-Fi, or any other suitable technology known in the industry. The state evaluator 238 may also be configured to communicate with other devices or systems external to the state evaluator 238.

The power module 248 controls power flow to other components internal to the state evaluator 238. The power module 248 may connect to input assembly 260. In some embodiments, the power module 248 receives power from input connector 262. Switch 264 controls the power module 248 such that the power module 248 powers on and off other portions of the state evaluator 238. Other embodiments of the state evaluator 238 use wireless technology to provide power to the power module 248. In such embodiments, the state evaluator 238 includes a wireless power receiving device. The wireless technology used to provide power to the state evaluator 238 may also provide communications to and from the state evaluator 238.

In some embodiments, the power module 248 communicates with the controller 246. The controller 246 may command the power module 248 to turn on or off specific portions of the state evaluator 238. For example, the controller 246 may command the power module 248 to de-energize the camera assembly 251. Another non-limiting example is the controller 246 commands the power module 248 to use only power from the power source 250. Other examples include applying power to or removing power from wireless devices, memory cards, and any other devices or circuits internal to the state evaluator 238.

Power source 250 provides power to the state evaluator 238 when the state evaluator 238 is not receiving power from an external source or when commanded by the external device. In some embodiments, the state evaluator 238 can be commanded to use power from the power source 250 even though an external power source is operationally engaged with the state evaluator 238. In some embodiments, the power source 250 is a battery; where in certain of those embodiments the battery may be removably located in a compartment having access through the evaluator housing 244. In other embodiments, the battery is fixedly attached in the interior of the state evaluator 238. In yet other embodiments, the power source 250 is one or more super capacitors or similar power storage technology. Alternatively, the power source 250 may be any suitable source known in the industry.

In the embodiment shown and described as FIG. 2A, the camera assembly 251 comprises a camera 252 and a camera lens 254. It is to be appreciated that the camera assembly 251 may consist of fewer or more components. The camera assembly 251 is configured to have a field of view 255 outside of the evaluator housing 244. In some embodiments, the camera assembly 251 has a resolution of 3280×2464 pixels. Other embodiments may have a higher resolution while still other embodiments may have a lower resolution. In some embodiments, the resolution is variable and may be controlled by the controller 246.

In the embodiment represented in FIG. 2A, the camera assembly 251 is disposed at the front side 266 of the evaluator housing 244. The light assembly 256 is also disposed on the front side 266 to illuminate any area or object in the camera assembly's 251 field of view 255. However, in other embodiments, the camera assembly 251 may be disposed on the rear side 268, the left side 270, or the right side 272. Some embodiments have a light assembly 256 disposed coplanar with the camera assembly 251. Other embodiments have only a light assembly 256 or a camera assembly 251 disposed on any particular side 266, 268, 270, 272. Additional embodiments may have multiple camera assemblies and/or multiple light assemblies 256 disposed on a side 266, 268, 270, 272, the top 274, and the bottom 276. For example, two camera assemblies 251 and one light assembly 256 may be disposed on the front side 266. As another example, two camera assemblies 251 and two light assemblies 256 may be disposed on the top 274.

In some embodiments, the camera assembly 251 is capable of detecting visible light. In other embodiments, the camera assembly 251 is capable of detecting either infrared light or ultraviolet light. In additional embodiments, the camera assembly 251 is capable of detecting at least two of infrared light, visible light, and ultraviolet light. The camera assembly 251 may have a variable focal length or a fixed focal length. The camera assembly 251 may also have a fixed aperture or a variable aperture. The camera assembly 251 may use any imaging technology known in the industry and suitable for the needs of the present invention in all of its various embodiments. The camera lens 254 may be of any type known in the industry including, but not limited to, standard, macro, telephoto, wide angle, close up, and panoramic.

The camera assembly 251 feeds data to the controller 246 during operation. In some embodiments, the data may be image data. In other embodiments, the data may be a combination of image data and other types of data. As a non-limiting example, the data may be a combination of image data, camera control data, and camera status data. The camera status data may include any settings associated with the operation of the camera assembly 251 such as, but not limited to, f-stop, zoom, aperture, time, date, and resolution. In some embodiments, the controller 246 controls the operation of the camera assembly 251, which may include the type, amount, and rate of data to be communicated. In other embodiments, the camera assembly 251 is preconfigured to communicate specific sets of data, which may include specific types, amounts, and rates of the data to be communicated. The controller 246 may control any of the variable settings associated with the camera assembly 251.

Light assembly 256 may comprise a single light source or multiple light sources (three light sources 256A-C are illustrated in FIG. 2A). In some embodiments, the light assembly 256 may emit a single wavelength where in alternative embodiments, the light assembly 256 may emit multiple wavelengths simultaneously. The light sources 256A-C may each operate at the same wavelength and intensity, or each of the individual light sources 256A-C may emit varying wavelengths at varying intensities. For example, the intensity of the output from the light assembly 256 may be 1000 lumens. The intensity of the output may also be less than 1000 lumens and more than 1000 lumens. In a multiple light source 256A-C configuration, each of the individual light sources 256A-C may emit differing light intensity to achieve an overall desired output of 1000 lumens from the light assembly 256. When there is less than three (3) light sources 256A-C or more than three (3) light sources 256A-C, the number and type of light sources can be varied to achieve a desired color balance and luminosity in a particular viewable area or field of view 255.

As shown in FIG. 2A, light assembly 256 comprises three light sources 256A-C. Each of the light sources 256A-C may emit identical spectrum of light. However, in some embodiments, each of the light sources 256A-C may emit a different wavelength wave length. The intensity of each of the light sources 256A-C may be varied to create light having a specific light and color balance at a specific intensity. For example, light source 256A may emit light in the 400 nm-500 nm spectrum, light source 256B may emit light in the 500 nm-600 nm spectrum, and light source 256C may emit light in the 600 nm-700 nm spectrum. As another example, light source 256A may emit ultraviolet light that is less than 400 nm, light source 256B may emit visible light from 400 nm to 700 nm, and light source 256C may emit infrared at greater than 700 nm. The output of any combination of light sources may be varied depending on the number of individual light sources, the types of light sources, and the lighting requirements of the area to be viewed.

In some embodiments, the light assembly 256 illuminates at least the field of view 255 or any area or object viewable in the library interior 16. For example, the light assembly 256 may put out the equivalent of 1000 lumens at 24 inches. The light assembly 256 may also put out more than 1000 lumens or less than 1000 lumens at 24 inches. The amount of light put out by the light assembly 256 may be controlled by the controller 246. In some embodiments, the light assembly 256 is turned on and off by the power module 248 and the intensity is controlled by the controller 246. In other embodiments, the light assembly 256 is controlled by the power module 248.

In alternative embodiments, one of the individual light sources 256A-C may be a high intensity light source, which may be used when capturing high resolution images. The high resolution images may be motion or still photography. The high intensity light may produce 1,000,000 lumens. The high intensity light may also produce more than or less than 1,000,000 lumens. The output of the high intensity light may be variable, and in some embodiments the controller 246 controls the intensity.

It is to be appreciated that each of the light sources 256A-C may be located at separate locations in the state evaluator 238. As a non-limiting example, light source 256A may be a high intensity light located co-planar with a camera assembly 251 configured to only capture still images. As another non-limiting example, light source 256B may be an infrared light located co-planar with a camera assembly 251 configured to only capture infrared images. In some embodiments, the light assembly 256 may be a ring disposed around the camera assembly 251. In other embodiments, the light sources 256A-C may be individual rings concentrically disposed around the camera assembly 251.

The indicator assembly 258 may comprise individual indicators. As shown and described in FIG. 2A, the indicator assembly 258 comprises four (4) indicators 258A-D and is located on left side 270. However, other embodiments may have fewer or more than four (4) indicators, including embodiments having no indicator assembly 258. Additional embodiments may have indicators 265 disposed at various positions on the evaluator housing 244 without the use of an indicator assembly 258, including disposing indicators individually on different sides 266, 268, 270, 272, the top 274, and the bottom 276.

Indicators 258A-D and indicator 265 (included as part of the input assembly 260 in this embodiment) may indicate different information by varying its output color or by strobing, varying, and pulsing its output. For example, as shown in FIG. 2A, indicator 258A may indicate power is applied to the state evaluator 238. Indicator 258B may indicate the state evaluator 238 is charging the power source 250. Indicator 258C may indicate the power source 250 is low. Indicator 258D may indicate that the state evaluator 238 is charged. Other information that may be indicated by the indicators 258A-D and indicator 265 is the detection of an issue with the power source 250, controller 246 issues, loss or establishment of communication, and system activity.

As shown in FIG. 2A, input assembly 260 is located on front side 266. Input assembly 260 may comprise an input connector 262, a switch 264, and an indicator 265. The input connector 262 uses any type of connector known in the art that will accomplish the goals of the present invention. For example, input connector 262 may be USB, FireWire, Lightning Port, or a custom connector. Input connector 262 may provide for data communication between the state evaluator 230 and the host system 234. Input connector 262 may also provide external power to operate the state evaluator 238 or provide power to charge the power source 250. The input assembly 260 may also have a CM reader. It is to be appreciated that a CM reader may be located elsewhere on the evaluator housing 244.

The switch 264 may be any type of switch capable of accomplishing the goals of the present invention. For example, switch 264 may be a rocker switch, a slide switch, or a pressure switch. When switch 264 is in a first position, the state evaluator 238 may be in an "off" condition. When switch 264 is in a second position, the state evaluator 238 may be in an "on" condition. In some embodiments, the switch 264 has more than two (2) positions, where each position causes the activation or deactivation of different portions of the state evaluator 238 or places the state evaluator 238 into an operational condition. As a non-limiting example, controller 246 may only be programmed or reprogrammed when the switch 264 is in a third position.

The indicator 265 may be configured to indicate an internal condition of the state evaluator 238. For example, the indicator 265 may be configured to indicate when communication has been established with the media library 10 or an external device. The indicator 265 may also be configured to flash or pulse to indicate that data is being exchanged with the media library 10 or the external device. The flash or pulse rate may be linked to the rate data is exchanged. The indicator 265 may also be configured to display a first color to indicate the transfer of data from the state evaluator 238 and indicate a second color to indicate the transfer of data to the state evaluator 238. The indicator 265 does not have to be included in the input assembly 260 and may be included on any surface of the state evaluator 238. The input assembly 260 may be configured with multiple indicators 265. The state evaluator 238 may also have one or more indicators 265 located at various locations on the evaluator housing 244. In some embodiments, the controller 246 controls the indicators 265. In other embodiments, the indicators 265 are controlled by other devices or sub-systems in the state evaluator 238, such as the power module 248.

Figure 2B:
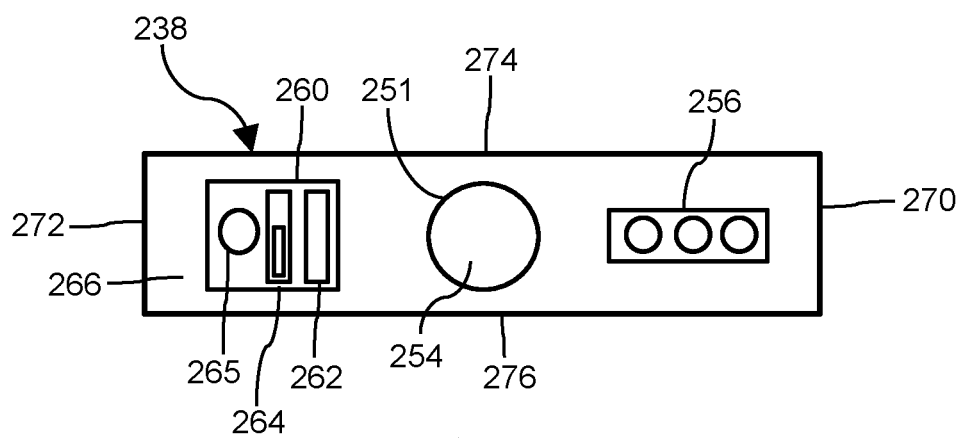
FIG. 2B is a front view of an embodiment of the state evaluator.

FIG. 2B shows a simplified front view of the state evaluator 238. As shown in FIG. 2B, the camera assembly 251, light assembly 256, and input assembly 260 are located on the front side 266. It is to be appreciated by one skilled in the art that the state evaluator 238 may have one or more additional cameras located on another side 268, 270, 272, the top 274, and the bottom 276.

Figure 3:
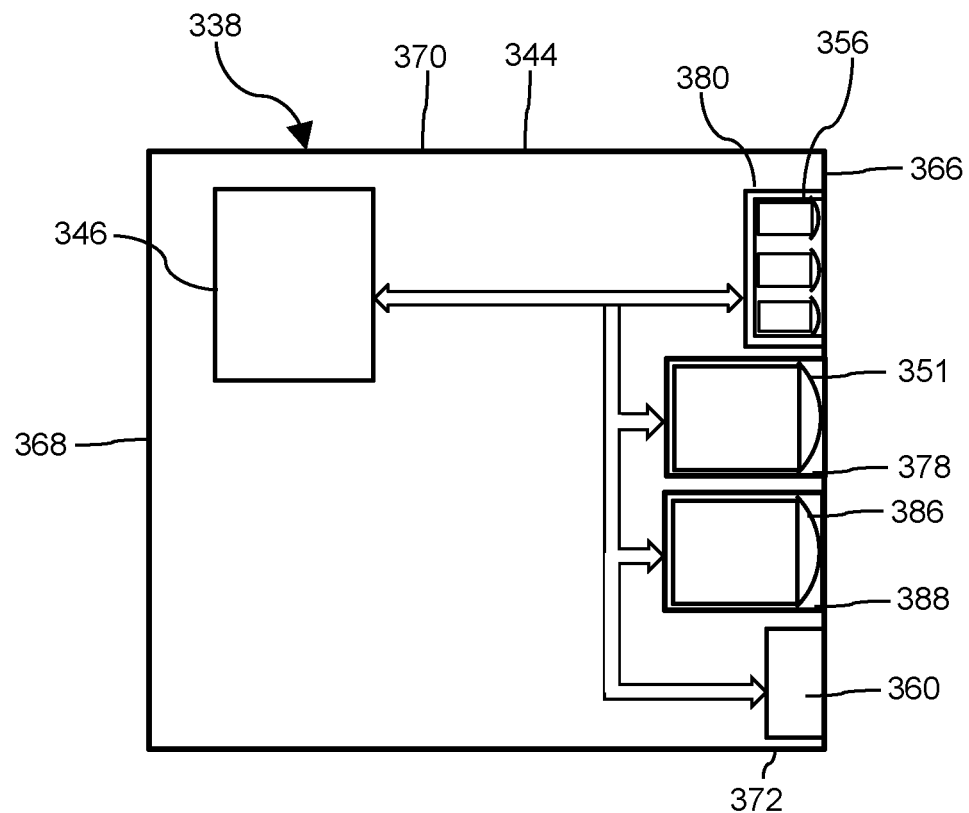
FIG. 3 is a simplified cutaway view of a state evaluator including a plurality of camera assemblies.

FIG. 3 is a simplified top view of a state evaluator 338. The camera assembly 351 is disposed in camera recess 378 such that no portion of the camera assembly 351 extends past the front side 366. The light assembly 356 is disposed in light recess 380 such that no portion of the light assembly 356 extends past the front side 366. One non-limiting reason to ensure no internal portion of the state evaluator 338 extends past the housing is to ensure the state evaluator 338 may be fully manipulated by a media library 10, including insertion into a media drive 26 and storage locations 18, without interference from state evaluator's 338 components that my extend past the evaluator housing 344. Also included in state evaluator 338 is camera assembly 386 located in camera recess 388 on the front side 366. It is to be appreciated that camera assembly 386 may be located on a surface other than the front side 366. For example, camera assembly 386 may be located on the right side 372. Camera assembly 386 may extend past the housing 344 even though camera assembly 351 does not extend past the housing 344.

Figure 4:
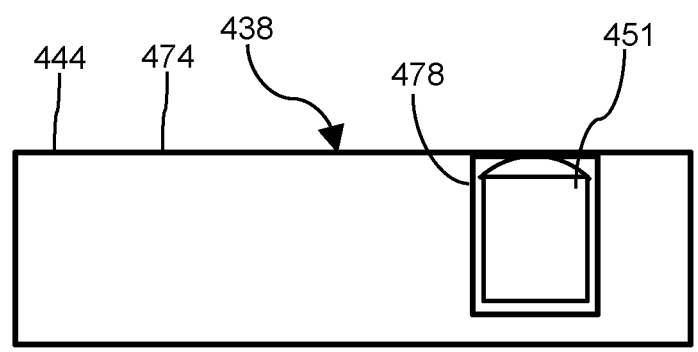
FIG. 4 is a simplified side view of the state evaluator including one camera assembly.

FIG. 4 is a simplified side view of a state evaluator 438. A camera assembly 451 is disposed in a camera recess 478 such that no portion of the camera assembly 456 extends past the top 474. It should be noted that camera assembly 456 and camera recess 478 may be located anywhere on the housing 444 to accommodate desired viewing areas around the state evaluator 438.

Figure 5:
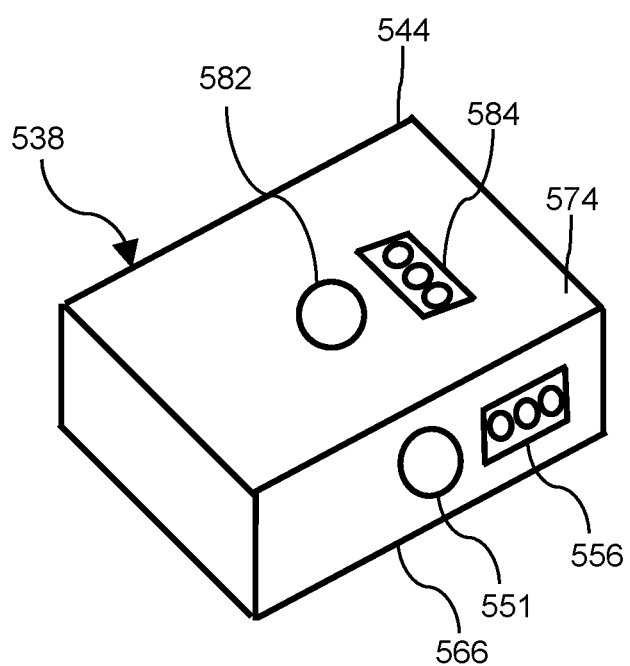
FIG. 5 is a simplified perspective view of an embodiment of the state evaluator having including a plurality of cameras and a plurality of light sources.

FIG. 5 is a simplified perspective view of a state evaluator 538. State evaluator 538 comprises camera assembly 551, light assembly 556, second camera assembly 582, and second light assembly 584. Other embodiments may have multiple camera assemblies on multiple surfaces of the housing 544. For example, the camera assembly 551 may be located on the front 566 and the second camera assembly 582 may be located on the top 574.

In alternative embodiments, the camera assembly 551 and the second camera assembly 582 are located co-planar. For example, the first camera assembly 551 and the second camera assembly 582 may be disposed on the top 574. One or more light assemblies 584 may also be disposed on the top 574. For example, the camera assembly 551 may be configured to capture motion video while the second camera assembly 582 may be configured to capture high resolution still images. Another example is the camera assembly 551 and the second camera assembly 582 can be used in conjunction to create stereoscopic vision. In some embodiments, stereoscopic vision may increase precision and accuracy of position data associated with position markers 22. Referring back to the embodiment illustrated in FIGS. 2A and 2B, each embodiment of the state evaluator may also have at least one of an input assembly 260, an input connector 262, a switch 264, an indicator assembly 258, and one or more individual indicators 265.

In operation, the various embodiments of the state evaluator 38 capture a set of data then communicate the set of data to media library 10 or an external device for further processing. In some embodiments, the state evaluator 38 may process the data internally. In other embodiments, the data may be at least partially processed by the state evaluator and unprocessed data is at least partially processed by the media library 10 or the external device. The controller 246 may communicate to the media library 10 or the external device the results of its internal processing, if any, and the unprocessed data, if any. The controller 246 may also communicate to the media library 10 or the external device all of the data, whether processed or unprocessed, and any results from internal processing.

In certain embodiments, the state evaluator 38 is configured to visually identify position markers 32 located throughout the media library 10. The camera assembly 251 captures an image and converts that image into data. The camera assembly 251 then exchanges the data with the controller 246. The controller 246 may store the data locally or communicate the data to the media library 10 or the host system 34. Alternatively, the controller 246 may process the data to at least in part determine a position or a physical condition of the media library 10. For example, the camera assembly 251 may capture an image of a position marker 32 at a known location and convert the image into data. The camera assembly 251 then communicates that data to the controller 246. In some embodiments, the controller 246 may analyze the data to determine an offset between the indicated position and the actual position of the state evaluator 38. In other embodiments, the controller 246 may store the data locally for future use or may communicate the data to the media library 10 or the external device for further analysis or real-time monitoring. Based on the differences between the expected location of the state evaluator 38 and the actual position based on the captured image of the position marker 32, offset values can be generated and used by the media library 10 to ensure smooth and proper operation. Some embodiments will capture images of multiple position markers 32 located throughout the media library 10. Position markers 32 may be located in the library interior 16, at the storage locations 18, on the racks 23, on the media retriever 24, and on the media drives 26. It is to be appreciated that additional position markers 32 may be located at other locations in and around the media library 10 useful in determining the internal state of a media library 10.

As another example, the camera assembly 251 may capture and covert an infrared image or an ultraviolet image into data, then communicate that data to the controller 246. In some embodiments, the controller 246 will analyze the data to determine the existence of any thermal anomalies and communicate the data and the results of the analysis. Other embodiments have the controller 246 communicating just the data for further analysis.

The state evaluator 38 may be moved to a position in the media library 10 allowing it to view a specific internal area of the medial library 10. For example, the state evaluator 38 may be moved to view a media cartridge 20 in a media drive 26 or a storage location 18 for proper positioning. In some embodiments, the media cartridge 20 may have visual indicators located on at least one of its surfaces that are captured by the state evaluator 38. In other embodiments, the state evaluator 38 is inserted into a storage location 18 or media drive 26.

Figure 6:
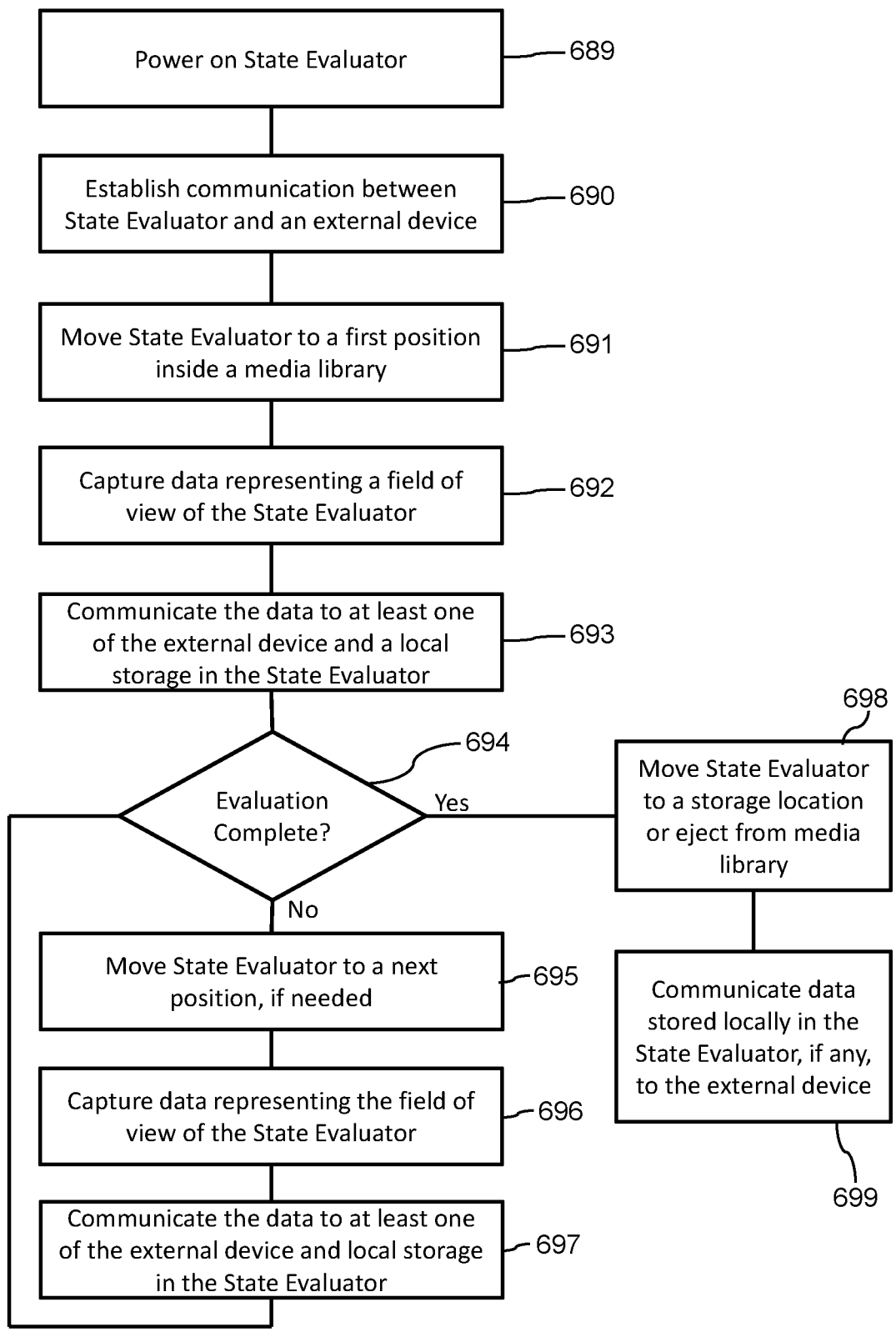
FIG. 6 is a flow chart illustrating one embodiment of a method for evaluating the internal state of a media library.

FIG. 6 is a flow diagram showing a method of use of a state evaluator 38. Step 689 powers on the state evaluator 38. Step 690 establishes communication between the state evaluator 38 and an external device, such as the control system 30 or the host system 34. In step 691, the state evaluator 38 is inserted into a media library 10 and moved to a first position. Step 692 captures data representing the field of view 255 of the state evaluator 38. In step 693, the data is communicated to the external device or stored locally in the state evaluator 38. Step 694 determines if the evaluation is complete. If the evaluation is not complete, step 695 moves the state evaluator 38 to a next position, if desired. The state evaluator 38 may not need to be repositioned if it is desired to capture additional data from the current field of view. In step 696, data is captured with the state evaluator 38. In step 697, the data is communicated to the external device or stored locally in the state evaluator 38. The process then returns to step 694 to determine if the evaluation is complete.

If the evaluation is complete in step 694, step 698 has the state evaluator 38 moved to a storage location 18 inside the media library 10 or it is ejected from the media library 10. Lastly, in step 699, the state evaluator 38 communicates locally stored data, if any, to the external device. It is to be appreciated that additional steps may be added, including converting the image from the field of view 255 into data, communicating the data to the controller 246, and storing some or all of data locally.

The method of using a state evaluator 38 may also include the use of a media cartridge 20 having calibration marks located on at least one of the sides, the top, and the bottom. Preferably, the media cartridge 20 will have calibration marks on all sides, the top and the bottom however other embodiments may have calibration marks on fewer surfaces. In some embodiments, the media cartridge 20 is fully functional where in other embodiments the media cartridge 20 has reduced functionality. In other embodiments, the media cartridge 20 has no internal functionality. In use, the media library 10 moves the media cartridge 20 to a first position, such as, for example, into a storage location 18. The media library 10 then moves the state evaluator 38 to a second position that allows the state evaluator 38 to capture an image of the media cartridge 20 that includes the calibration marks. In some embodiments, the captured image may also include at least one position marker 32. In other embodiments, the captured image may not include any calibration marks or position markers 32.

The state evaluator 38 may also be positioned inside the media library 10 to allow the state evaluator 38 to monitor a particular aspect of the media library 10 over a period of time. This may include continuously capturing motion video or capturing a still image or video segments at periodic time intervals. For example, the state evaluator 38 may be positioned such that an internal component of the media library, for example a media drive 26, can be monitored using infrared imaging over a period of time to identify thermal anomalies. As another example, the state evaluator 38 may be positioned such that the state evaluator 38 captures images or video of moving cables and connectors at periodic time intervals to verify proper movement during operation.

The media library 10 may move the state evaluator 38 to a first position, such as a storage location 18. The storage location 18 may be strategically located to allow the state evaluator 38 a particular view of the library interior 16, however the positioning of the state evaluator 38 in a storage location 18 is not to be considered limiting. The media library 10 then moves the media cartridge 20 to a second position. The second position may be in a storage location 18, engaged by the media retriever 24, or inserted into a media drive 26. The media library 10 then may move the state evaluator 38 to a third position. The third position may give the state evaluator 38 a better view of the media cartridge 20. The state evaluator 38 may capture multiple images of the library interior 16. The state evaluator 38 may then process the data, store the data locally, or communicate the data to an external device. In some embodiments, the state evaluator 38 may perform at least some processing of the data to determine an outcome, such as calibration offsets.

After the state evaluator 38 is removed from the media library 10, communication between the state evaluator 38 and an external device, such as the control system 30 or the host system 34, may be established or re-established, if needed. The state evaluator 38 may then communicate data to the external device. In some embodiments, the external device may communicate data back to the state evaluator 38.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the state evaluator have been illustrated and described herein, one or more features of any one embodiment can be combined with one or more features of one or more of the other embodiments, provided that such combination satisfies the intent of the present invention.

While a number of exemplary aspects and embodiments of the state evaluator have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for evaluating an internal state of a media library, the method comprising the steps of:
   coupling a first camera to a housing having a form factor of a media cartridge, the first camera having a field of view external to the housing;
   coupling a second camera to the housing, the second camera being spaced apart from the first camera, the first camera and the second camera being used in conjunction to create stereoscopic vision;
   illuminating a library interior of the media library with a light assembly;
   generating data with the cameras, the data being representative of the field of view; and
   analyzing the data generated by the cameras with a controller.

2. The method of claim 1 wherein the step of generating data with the camera includes capturing images of a plurality of position markers from within the media library.

3. The method of claim 1 wherein the step of generating data with the camera includes capturing images of (i) a calibration marker on the media cartridge, and (ii) a position marker from within the media library.

4. The method of claim 1 wherein the step of generating data with the camera includes capturing one of an infrared image and an ultraviolet image.

5. The method of claim 1 wherein the step of generating data with the cameras includes capturing images of moving cables and connectors at periodic time intervals to verify proper movement during operation.

6. The method of claim 1 wherein the step of generating data with the cameras includes capturing video of moving cables and connectors at periodic time intervals to verify proper movement during operation.

7. The method of claim 1 further comprising the step of positioning a calibration media cartridge in a plurality of positions within the media library, the cameras capturing images of the calibration media cartridge at each of the plurality of positions within the media library.

8. The method of claim 7 wherein the calibration media cartridge includes a position marker.

9. The method of claim 1 wherein the step of generating data with the cameras includes (i) the first camera capturing motion video, and (ii) the second camera capturing high resolution still images.

10. A state evaluator for evaluating an internal state of a media library, the state evaluator comprising:
a housing in the form of a media library cartridge;
a first camera that is coupled to the housing, the first camera having a field of view external to the housing;
a second camera that is spaced apart from the first camera, the second camera being coupled to the housing, the first camera and the second camera being used in conjunction to create stereoscopic vision, the cameras generating data that is representative of the field of view;
a light assembly that is configured to illuminate the media library; and
a controller that is positioned within the housing, the controller being configured to analyze the data generated by the cameras.

11. The state evaluator of claim 10 wherein the cameras are configured to generate data representing at least one of infrared wavelengths and ultraviolet wavelengths in the field of view.

12. The state evaluator of claim 10 wherein the data represents an internal state of the media library.

13. The state evaluator of claim 10 wherein the cameras are configured to capture images of a plurality of position markers from within the media library.

14. The state evaluator of claim 10 wherein the light assembly is configured to simultaneously emit at least two different wavelengths of light.

15. The state evaluator of claim 10 wherein the first camera and the second camera are coplanar.

16. The state evaluator of claim 10 wherein the cameras each include a camera lens.

17. The state evaluator of claim 10 wherein the light assembly is configured to vary the wavelength of light emitted by the light assembly.

18. The state evaluator of claim 10 wherein the light assembly comprises at least one light emitting diode.

19. The state evaluator of claim 10 wherein the light assembly is coplanar with the cameras.

20. The state evaluator of claim 10 wherein the light assembly includes a plurality of light sources.

* * * * *